US008732915B2

(12) United States Patent
Kolasa

(10) Patent No.: US 8,732,915 B2
(45) Date of Patent: May 27, 2014

(54) STRAP CLAMP WITH TRANSVERSE ORIENTED CAM DOOR

(75) Inventor: Scott D. Kolasa, Mount Prospect, IL (US)

(73) Assignee: Illinois Tool Works Inc., Glenview, IL (US)

(*) Notice: Subject to any disclaimer, the term of this patent is extended or adjusted under 35 U.S.C. 154(b) by 141 days.

(21) Appl. No.: 13/323,486

(22) Filed: Dec. 12, 2011

(65) Prior Publication Data
US 2012/0198664 A1 Aug. 9, 2012

Related U.S. Application Data

(60) Provisional application No. 61/439,694, filed on Feb. 4, 2011.

(51) Int. Cl.
F16B 2/18 (2006.01)
A42B 3/08 (2006.01)

(52) U.S. Cl.
USPC .............................. 24/170; 24/191

(58) Field of Classification Search
USPC .................. 24/712.6, 170, 191, 193, 182
See application file for complete search history.

(56) References Cited

U.S. PATENT DOCUMENTS 3,646,644 A * 3/1972 Watts ........................... 24/114.5
5,350,196 A * 9/1994 Atkins .......................... 280/808
5,469,583 A * 11/1995 Akeley et al. ................... 2/421

FOREIGN PATENT DOCUMENTS

GB 2311807 A * 10/1997

OTHER PUBLICATIONS

Pictures of Prior Art Cam Buckles.

* cited by examiner

Primary Examiner — Robert J Sandy
Assistant Examiner — Louis Mercado
(74) Attorney, Agent, or Firm — Mark W. Croll; Paul F. Donovan

(57) ABSTRACT

A webbing clamp incorporating a hollow base frame adapted to receive elongated webbing segments in threaded relation through a pair of opposing slot openings and a hinging camming door structure rotatably mounted within the base frame about an axis of rotation. The camming door structure includes a lever projection for user engagement and a camming ear portion extending below the lever projection for disposition at the interior of the base frame. The camming door structure is mounted transverse to the threading direction of the webbing segments and rotates about an axis generally aligned with the threading direction of the webbing segments. Upon closing the hinging door structure, the camming ear portion engages the webbing segments in a compressing manner thereby blocking relative sliding action with the webbing clamp.

17 Claims, 5 Drawing Sheets

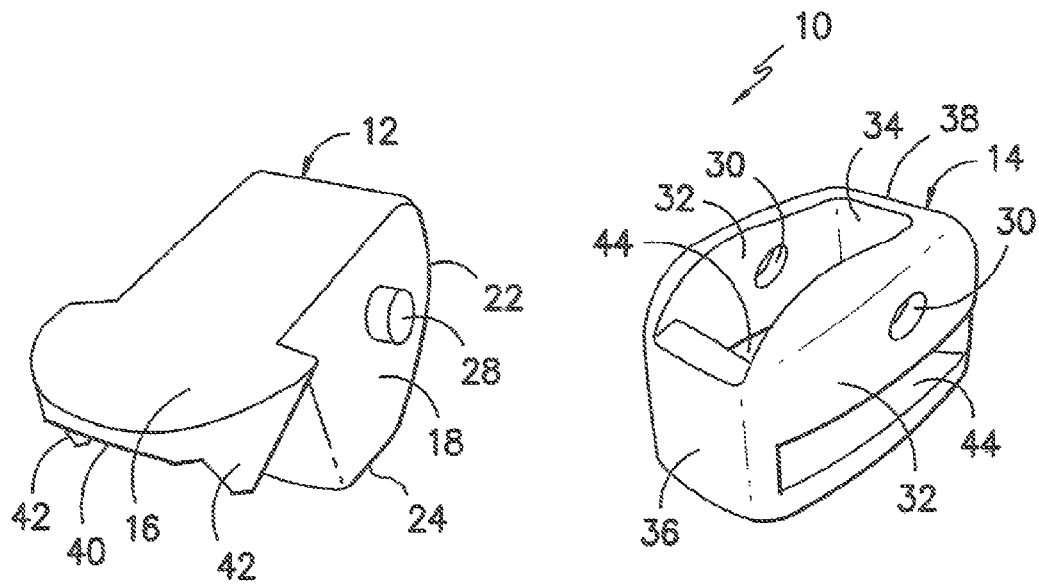
FIG. -1-
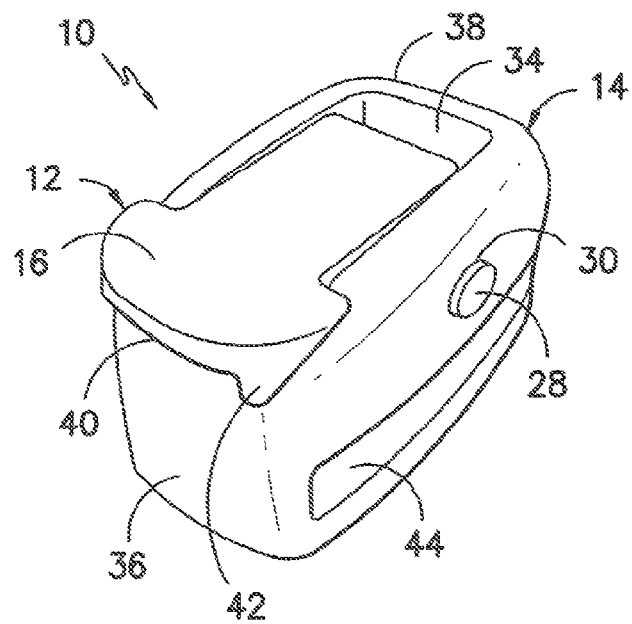
FIG. -2-

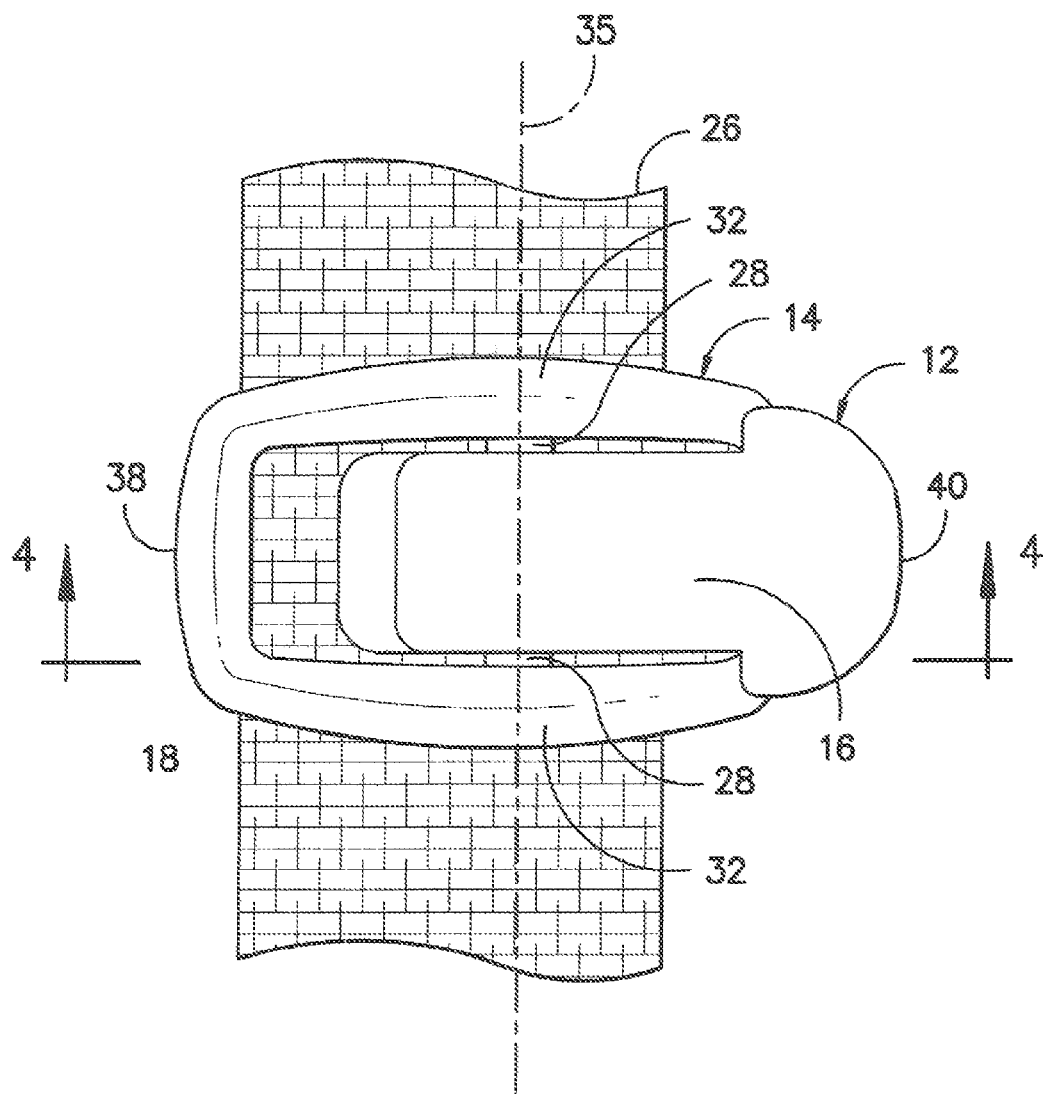
FIG. -3-

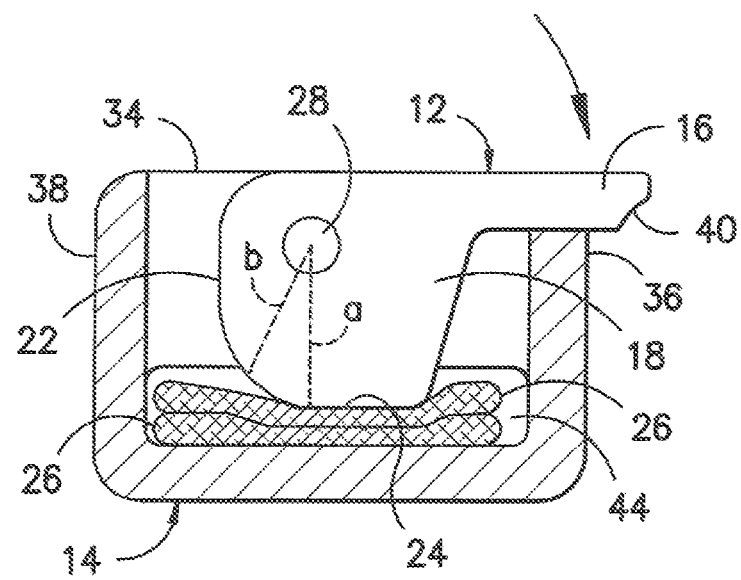
FIG. -4-
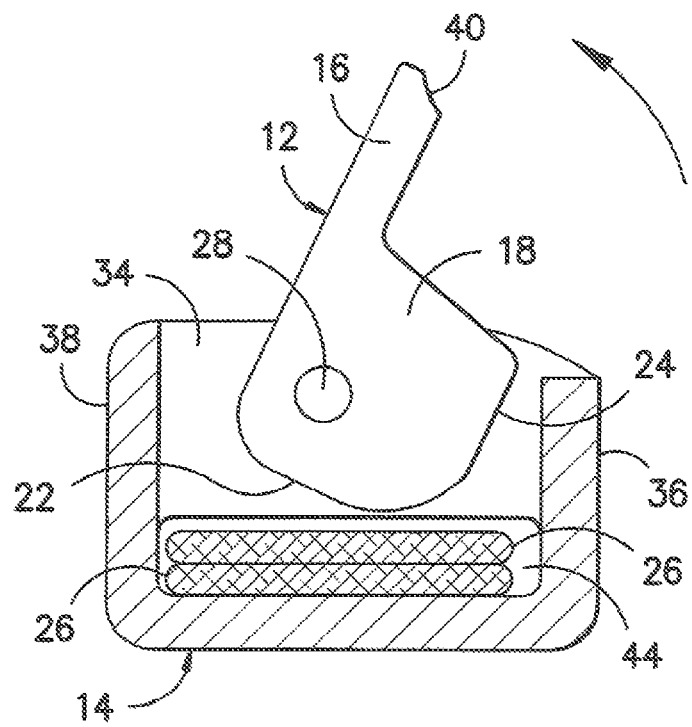
FIG. -5-

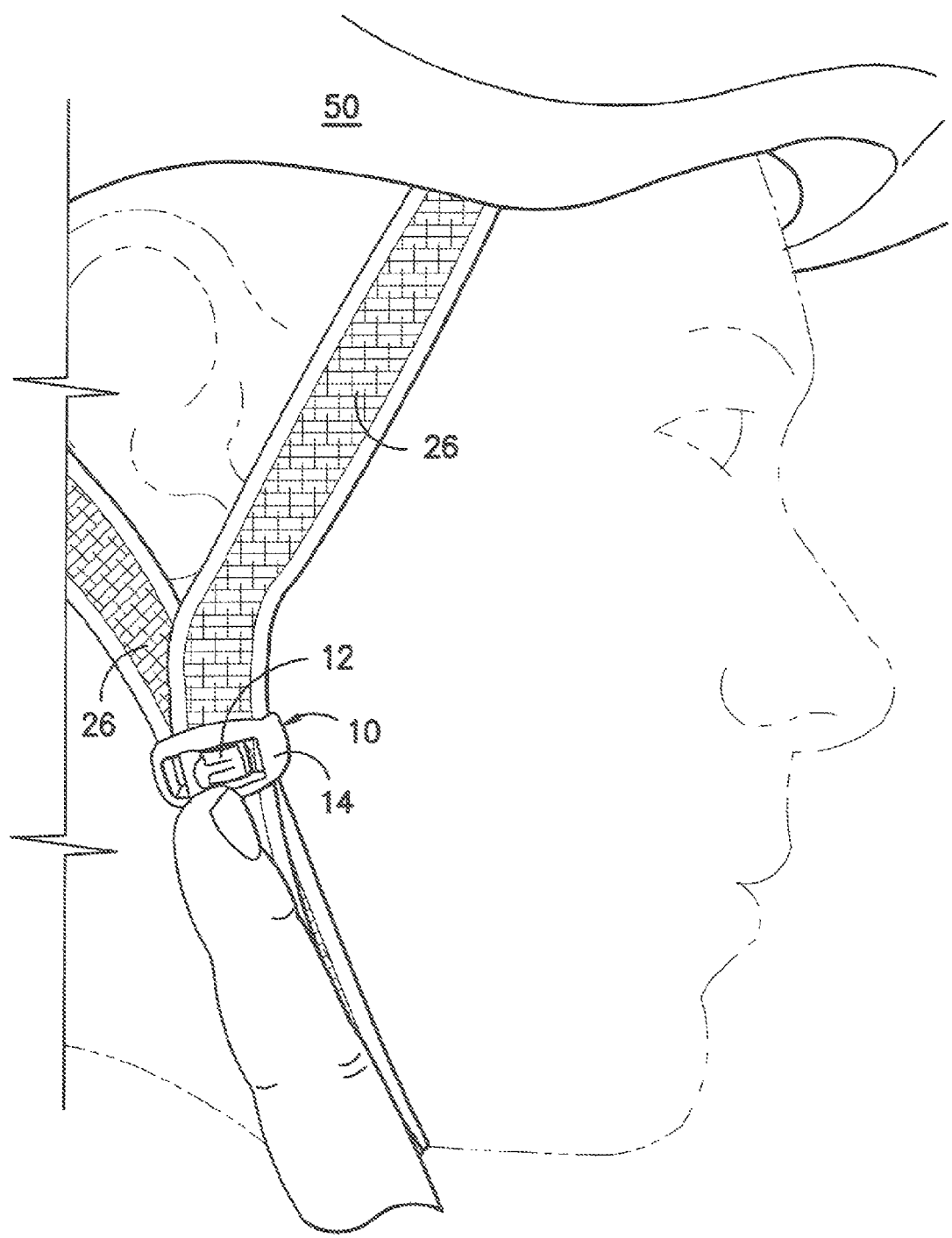
FIG. -6-

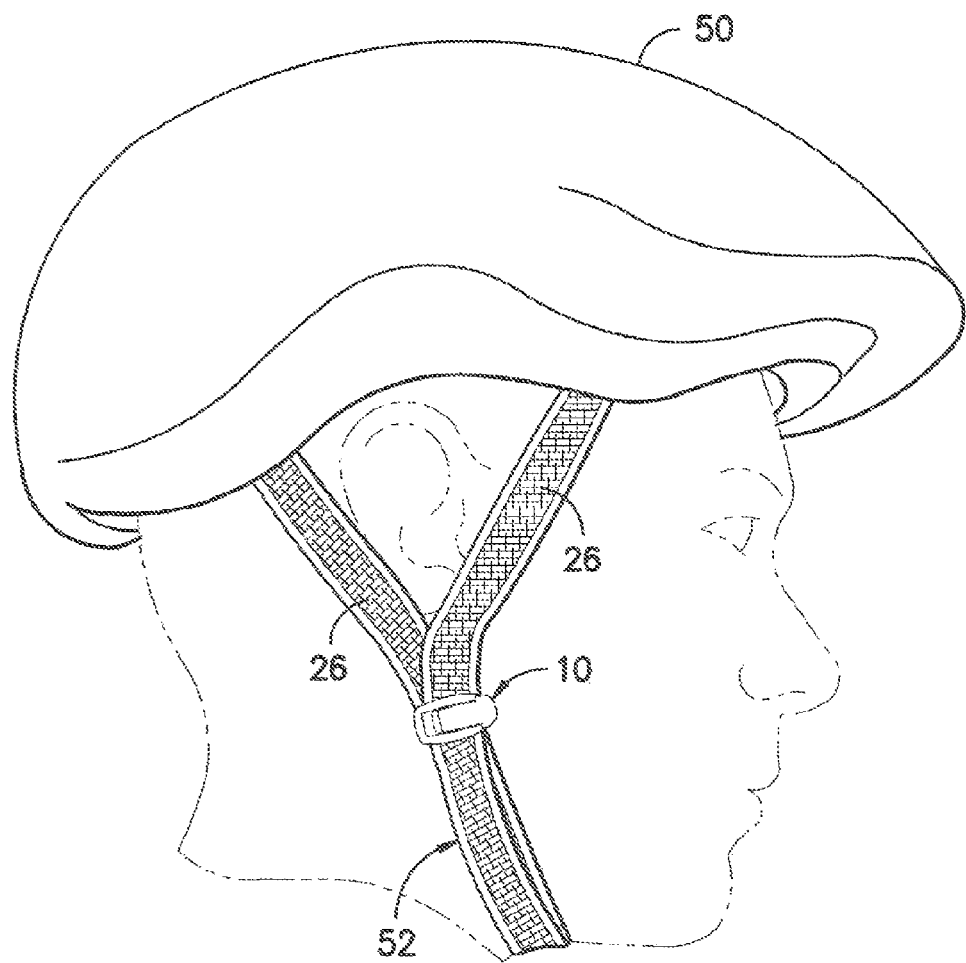
FIG. -7-

STRAP CLAMP WITH TRANSVERSE ORIENTED CAM DOOR

CROSS-REFERENCE TO RELATED APPLICATIONS

This non-provisional application claims the benefit of and priority from U.S. Provisional Application 61/439,694 filed Feb. 4, 2011. The contents of such prior application are hereby incorporated by reference in their entirety as if fully set forth herein.

FIELD OF THE INVENTION

The present invention relates generally to clamps, and more particularly to clamps adapted for sliding engagement and lock-down of straps or other webbing elements. Such clamps may be used in environments such as helmets, backpacks, clothing and the like.

BACKGROUND OF THE INVENTION

Clamps that slidingly engage webbing segments and which may be selectively locked down relative to such webbing segments are known. Such prior clamps typically incorporate a base frame adapted to receive webbing segments such that the base frame can slide along the length of the webbing segments and such that the webbing segments can be adjusted relative to one another by being selectively pulled through the base frame. Some prior clamps have incorporated lock-down elements in the form of camming doors which are held within a carrier frame in overlying relation to the webbing segments. However, in known prior clamps having hinging lock-down camming doors, the doors have typically been oriented to rotate on an arc which is generally aligned with the travel direction of the webbing segments. Such an orientation minimizes the potential for tilting displacement of the camming door when the webbing segments are pulled.

SUMMARY OF THE INVENTION

The present invention departs from prior designs by providing a webbing clamp incorporating a hollow base frame adapted to receive elongated webbing segments in threaded relation through a pair of opposing slot openings and a hinging camming door structure rotatably mounted within the base frame about an axis of rotation. The camming door structure includes a lever projection for user engagement and a camming ear portion extending below the lever projection for disposition at the interior of the base frame. The camming door structure is mounted transverse to the threading direction of the webbing elements and rotates about an axis generally aligned with the threading direction of the webbing elements. Upon closing the hinging door structure, the camming ear portion engages the webbing elements in a compressing manner thereby blocking relative sliding action of the webbing elements within the clamp.

In accordance with one exemplary aspect, the present invention provides an adjustable webbing clamp adapted to selectively slide along one or more elongate webbing segments and to lock such webbing segments in place at the interior of the webbing clamp. The webbing clamp includes a base frame having a plurality of walls at least partially surrounding an interior cavity. A door acceptance opening is disposed between a pair of opposed lateral sidewalls. Each of the lateral sidewalls includes a webbing slot extending through the sidewall. The webbing slots are adapted to receive the elongate webbing segments in threaded relation in a travel path across the interior cavity. The webbing clamp further includes a camming door adapted for receipt within the door acceptance opening. The camming door includes a lever portion and a camming ear adapted to be received within the interior cavity. The camming door is rotatably mounted at the base frame along an axis of rotation oriented in transverse relation to the lateral sidewalls and in substantial alignment with the travel path of the webbing segments. Upon rotating the lever portion to a raised position away from the base frame, the camming ear is raised away from the travel path of the webbing segments and upon rotating the lever portion towards the base frame, the camming ear is lowered into compressing, clamping relation against the webbing segments. A method of selectively clamping webbing is also provided.

Other features and advantages of the invention will become apparent to those skilled in the art upon review of the following detailed description, and drawings in which like numbers are used to designate like features.

BRIEF DESCRIPTION OF THE DRAWINGS

FIG. 1 is a schematic view of one exemplary embodiment of a webbing clamp in accordance with the present invention with components in a disassembled state;

FIG. 2 is a view of the webbing clamp of FIG. 1 in an assembled state;

FIG. 3 is a schematic elevation view illustrating the assembled webbing clamp of FIG. 2 engaging threaded webbing segments extending through opposing openings in the webbing base;

FIG. 4 is a schematic cut-away view taken generally along line 4-4 in FIG. 3 illustrating the camming door in locked orientation compressing the webbing;

FIG. 5 is a schematic cut-away view similar to FIG. 4 illustrating the camming door in open, unlocked relation to relieve the compression on the webbing segments; and FIGS. 6 and 7 illustrate the webbing clamp of FIG. 2 engaging a pair of webbing segments for selective tightening of a helmet chinstrap structure.

Before the embodiments of the intention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENTS

Reference will now be made to the drawings, wherein to the extent possible, like elements are designated by like reference numerals in the various views. Referring now to FIGS. 1 and 2, a webbing clamp 10 in accordance with one exemplary embodiment is shown. As shown, in the exemplary configuration, the webbing clamp 10 includes a camming door 12 adapted to be rotatably mounted within a base frame 14 of generally hollow bin-like construction. The camming door 12 and the base frame 14 each may be of substantially unitary molded construction formed from a suitable moldable polymeric material such as nylon, acetal resin or the like. However, non-polymeric materials may also be used if desired. In this regard, the camming door 12 and the base frame 14 may be formed from similar or dissimilar materials. By way of example only, and not limitation, the camming door 12 and the base frame 14 may each be formed from Nylon 6 or Nylon 6,6 by injection molding or a similar process.

As best illustrated through joint reference to FIGS. 1, 4 and 5, in the illustrated exemplary construction the camming door includes a lever portion 16 defining an outwardly projecting tongue for manipulation by a user between open and closed positions in a manner as will be described further hereinafter. The camming door 12 further includes an asymmetrical lobed camming ear 18 extending away from the plane defined by the lever portion 16. As best seen in FIGS. 4 and 5, the lever portion 16 in combination with the camming ear 18 cooperatively define a generally "b" shaped profile. As shown, in the illustrated configuration, the camming ear 18 has a rear surface 22 extending away from the plane defined by the lever portion 16. In the exemplary embodiment, the rear surface 22 is curved or angled radially inwardly and faces generally away from the direction in which the lever portion projects. As shown, the rear surface 22 may extend to a generally planar lower edge 24 defining oriented in a plane substantially parallel to the lever portion 16. As will be described further hereinafter, such a planar lower edge defines an extended surface compression foot for application of pressure against webbing segments 26 when the clamp is in a closed condition (FIG. 4). By way of example only, and not limitation, other profile shapes such as "L" shapes, "T" shapes, "J" shapes and the like with camming ears extending away from a lever portion to compress webbing segments 26 at the interior of the base frame also may be used if desired.

As noted previously, the camming door 12 is adapted to be supported in rotatable relation within the base frame 14. By way of example only, and not limitation, in the illustrated exemplary construction the camming ear 18 may include outwardly projecting pins 28 oriented in aligned relation to one another on opposing sides of the camming ear 18. In the exemplary embodiment, the base frame 14 has a generally bin configuration with an open top and including a pair of aligned through holes 30 extending through opposing lateral sidewalls 32. As may be understood through joint reference to FIGS. 1 and 2, the camming ear 18 of the door 12 may be pressed into the interior of the base frame 14 between the lateral sidewalls 32 until each of the pins 28 snaps into a corresponding one of the through holes 30. In this regard, as best seen in FIG. 1, in the exemplary construction the base frame 14 includes a door acceptance opening designated generally as 34 extending longitudinally along the top of the base frame 14 between the lateral sidewalls 32. The door acceptance opening 34 narrows progressively along its length from a relatively wide opening at a first end wall 36 to a more narrow width adjacent the opposing second end wall 38. According to the exemplary practice, the width of the door acceptance opening 34 adjacent the first end wall 36 will preferably accommodate insertion of the camming ear 18 with the outer surfaces of the pins 28 engaging the inner surfaces of the lateral sidewalls 32. As the camming ear 18 is inserted and the pins 28 are urged towards the through holes 30, the lateral walls 32 are forced outwardly to a slight degree by the pins 28 and then snap back as the pins 28 enter the through holes 30. The camming door 12 is thereby locked into place with the pins 28 projecting into the through holes 30. In this condition, since the outer diameter of the pins 28 is slightly smaller than the inner diameter of the through holes 30, the camming door 12 may be rotated relative to the base frame 14 about an axis of rotation 35 defined generally by the pins 28.

As shown, in the exemplary construction, the lever portion 16 may include a relatively wide distal lip 40 which extends beyond the first end wall 36 in the assembled condition (FIG. 2). As will be appreciated, this distal lip defines an overhang to facilitate finger manipulation by a user during rotation of the camming door 12. In the exemplary embodiment, the lever portion 16 also may include angled wing elements 42 extending downwardly from the perimeter of the lever portion on either side slightly rearward of the distal lip 40. As best seen in FIG. 2, the angled wing elements 42 may curve around underlying surfaces of the base frame 14 when the camming door 14 is in the closed position, thereby aiding in maintaining the closed position prior to intentional manipulation of the distal lip 40 by a user.

In the illustrated exemplary embodiment, the base frame 14 includes a pair of webbing slots 44 extending through the opposing lateral walls 32 at an elevation below the through holes 30. In practice, these webbing slots are adapted to receive one or more webbing segments 26 which extend in threaded relation through the webbing slots in transverse orientation to the base frame 14 and to the rotational direction of the camming door 12. That is, the length dimension of the webbing segments 26 is oriented in general alignment with the axis of rotation 35 of the camming door 12.

As shown in FIG. 4, the camming ear 18 is characterized by a distance "a" between the planar lower edge 24 and the pins 28 which is greater than the distance "b" between any portion of the rear surface 22 and the pins 28. Thus, as the camming door 12 is rotated about the axis defined by the pins 28 from the closed position of FIG. 4, to the open position of FIG. 5, the surface of the camming ear 18 is raised away from the travel path of the webbing segments 26. As shown in FIG. 5, when the camming door 12 is rotated to the fully open condition, the surface of the camming ear 18 may be disposed above the upper boundary of the webbing slots and the webbing segments 26 may slide freely through the webbing slots 44 relative to the base frame 14. Conversely, when the camming door 12 is rotated to the closed position (FIG. 4), the lower edge of the camming ear 18 moves to a position at least partially blocking the webbing slots 44 and compressing the webbing segments 26. In this compressed condition, the webbing segments 26 are constrained from sliding through the webbing slots 26. The webbing segments 26 are thus locked in place relative to the base frame 14. Moreover, as shown in FIG. 2, there is a slight gap in the closed position between the camming door 12 and the second end wall 38. As will be appreciated, this gap aids in preventing interference between the camming door 12 and the second end wall 38 during rotation from a closed to an open condition.

In the illustrated exemplary embodiment, the webbing slots 44 are oriented in planes which are substantially perpendicular to the axis of rotation 35 of the camming door as defined by the pins 28. Thus, the camming door 12 rotates through an arc which is transverse to the travel direction and length dimension of the webbing segments 26. Due to this orientation, when the webbing clamp 10 is in the closed and locked condition as illustrated in FIG. 4, the application of tension to the webbing segments 26 is transmitted to the camming ear 18 as a tilting force urging the camming door 12 to tilt relative to the lateral sidewalls 32 generally in the direction of the axis of rotation 35 defined by the pins 28. However, such tilting is blocked by the lateral sidewalls 32, thereby maintaining a stable locked condition.

Referring now jointly to FIGS. 4-7, the use of a webbing clap 10 to tighten and lock down webbing segments 26 cooperatively forming helmet chinstrap will now be described. As shown, in the exemplary environment of use a helmet 50 may be provided with a pair of elongated webbing segments extending downwardly away from the sides of the helmet to cooperatively form a chinstrap 52. As illustrated, the webbing segments 26 may converge at a position below a user's ear and travel as a double layer under the user's chin until separating again at a position below the opposing ear on the far side of the user's face (not shown). As will be appreciated, the effective length of the chinstrap 52 may be adjusted by changing the position at which the webbing segments 26 converge. Thus, the chinstrap 52 may be tightened or loosened by adjusting the position at which the webbing segments 26 converge. In this regard, if the webbing segments are held together in converging relation at a position close to the ear, the chinstrap 52 will be relatively tight corresponding to a short effective length, while moving the position of convergence away from the ear will result in a looser fit corresponding to a longer effective length.

When the user initially puts on the helmet 50, it is generally desirable for the chinstrap 52 to be relatively loose. Once the helmet 50 is adjusted to the proper position, it is then desirable to tighten the chinstrap 52 to hold the helmet 50 in place. As shown through joint reference to FIGS. 5 and 6, after the webbing segments 26 have been threaded through the webbing slots 44, the desired adjustment may be carried out with the camming door 12 opened to the position shown in FIG. 5 such that the camming ear 18 has been raised away from contacting relation with the webbing segments 26. In this condition, the webbing clamp 10 may slide freely along the length of the chinstrap 52 to provide the desired degree of tightening or loosening.

Once the desired tightness has been achieved, the webbing clamp 10 may then be locked down as shown in FIG. 7, by closing the camming door 12 such that the camming ear compresses the webbing segments 26 (FIG. 4). This compression thereby prevents further relative movement of the webbing clap 10 along the length of the chinstrap 52 until the camming door 12 is reopened. As noted previously, the application of tension to chinstrap 52 with the camming door 12 in the closed position results in a tilting force being transmitted to the camming ear 18 thereby urging the camming door 12 to tilt relative to the lateral sidewalls 32. However, such tilting is blocked by the lateral sidewalls 32, thereby maintaining a stable locked condition. Of course, a similar clamping arrangement may be used on the opposing side of the helmet 50 thereby providing additional adjustability if desired.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

What is claimed is:

1. An adjustable webbing clamp adapted to selectively slide along one or more elongate webbing segments and to lock such webbing segments in place at the interior of the webbing clamp, the webbing clamp comprising:

a base frame including a plurality of walls at least partially surrounding an interior cavity, wherein a door acceptance opening is disposed between a pair of opposed lateral sidewalls, and wherein each of the lateral sidewalls includes a webbing slot extending through the sidewall, the webbing slots being entirely enclosed by said lateral sidewalls and adapted to receive said one or more elongate webbing segments in threaded relation in a travel path across the interior cavity; and a camming door adapted for receipt within the door acceptance opening, the camming door including a lever portion and a camming ear adapted to be received within the interior cavity, the camming ear having a substantially lobe-shaped profile including a rear surface and a lower edge, the rear surface having a generally flat surface portion that is generally transverse to the lever, and the rear surface further having a curved portion extending between the generally flat surface portion and the lower edge, wherein the camming door is rotatably mounted at the base frame along an axis of rotation oriented in transverse relation to the lateral sidewalls and in substantial alignment with the travel path of the webbing segments such that upon rotating the lever portion to a raised position away from the base frame, the camming ear is raised away from the travel path of the webbing segments and upon rotating the lever portion towards the base frame, the camming ear is lowered into compressing, clamping relation against the webbing segments, the camming door being further configured such that the lower edge is disposed at an elevation below the rear surface and such that the lower edge is spaced apart from the axis of rotation at a distance which is greater than the distance between the axis of rotation and any portion of the rear surface.

2. The adjustable webbing clamp as recited in claim 1, wherein the webbing segments cooperatively form a helmet chinstrap.

3. The adjustable webbing clamp as recited in claim 1, wherein each of the base frame and the camming door is a polymeric molded structure of unitary construction.

4. The adjustable webbing clamp as recited in claim 1, wherein the door acceptance opening extends from a first end wall oriented transverse to the lateral sidewalls towards a second end wall oriented transverse to the lateral sidewalls, and wherein the first and second end walls are shorter than the lateral sidewalls.

5. The adjustable webbing clamp as recited in claim 1, wherein each of the lateral sidewalls further includes a through hole at an elevation above the webbing slots, the through holes being disposed in substantially opposing aligned relation to one another.

6. The adjustable webbing clamp as recited in claim 5, wherein the axis of rotation is defined by a pair of pins projecting outwardly from opposing sides of the camming ear, the pins being adapted for receipt within corresponding opposing through holes in the lateral sidewalls upon insertion of the camming ear into the interior cavity.

7. The adjustable webbing clamp as recited in claim 6, wherein the door acceptance opening extends from a first end wall oriented transverse to the lateral sidewalls towards a second end wall oriented transverse to the lateral sidewalls, wherein the first and second end walls are shorter than the lateral sidewalls, and wherein the width of the door acceptance opening is greater at the first end wall than at the through holes.

8. The adjustable webbing clamp as recited in claim 1, wherein the lower edge is substantially flat defining a surface substantially parallel to the lever portion.

9. The adjustable webbing clamp as recited in claim 1, wherein the lower edge is substantially flat and wherein upon rotating the lever portion towards the base frame, the lower edge is disposed at an elevation below upper edges of the webbing slots.

10. An adjustable webbing clamp adapted to selectively slide along one or more elongate webbing segments and to lock such webbing segments in place at the interior of the webbing clamp, the webbing clamp comprising:

a base frame including a plurality of walls at least partially surrounding an interior cavity, wherein a door acceptance opening is disposed between a pair of opposed lateral sidewalls, and wherein each of the lateral sidewalls includes a webbing slot extending through the sidewall, the webbing slots being adapted to receive said one or more elongate webbing segments in threaded relation in a travel path across the interior cavity; and a camming door adapted for receipt within the door acceptance opening, the camming door including a lever portion and a camming ear adapted to be received within the interior cavity, wherein the camming door is rotatably mounted at the base frame along an axis of rotation oriented in transverse relation to the lateral sidewalls and in substantial alignment with the travel path of the webbing segments such that upon rotating the lever portion to a raised position away from the base frame, the camming ear is raised away from the travel path of the webbing segments and upon rotating the lever portion towards the base frame, the camming ear is lowered into compressing, clamping relation against the webbing segments, wherein flexible angled wing elements extend downwardly away from perimeter edges of a distal lip at the end of the lever portion.

11. An adjustable webbing clamp adapted to selectively slide along one or more elongate webbing segments and to lock such webbing segments in place at the interior of the webbing clamp, the webbing clamp comprising:

a base frame including a plurality of walls at least partially surrounding an interior cavity, wherein a door acceptance opening is disposed between a pair of opposed lateral sidewalls, and wherein each of the lateral sidewalls includes a webbing slot extending through the sidewall, the webbing slots being entirely enclosed by said lateral sidewalls and disposed in substantially opposing relation to one another and adapted to receive said one or more elongate webbing segments in threaded relation in a travel path across the interior cavity, each of the lateral sidewalls further including a through hole at an elevation above the webbing slots; and a camming door adapted for receipt within the door acceptance opening, the camming door having a substantially "b" shaped profile including a lever portion including a distal lip adapted to project outwardly from the base frame and a camming ear adapted to be received within the interior cavity, wherein the camming door is rotatably mounted at the base frame along an axis of rotation oriented in transverse relation to the lateral sidewalls and in substantial alignment with the travel path of the webbing segments, the axis of rotation being defined by a pair of pins projecting outwardly from opposing sides of the camming ear, the pins being adapted for receipt within opposing through holes upon insertion of the camming ear into the interior cavity, the camming ear including a rear surface facing away from the distal lip and a substantially flat lower edge defining a compression foot disposed at an elevation below the rear surface, the lower edge being spaced apart from the axis of rotation at a distance which is greater than the distance between the axis of rotation and the rear surface such that upon rotating the distal lip away from the base frame, the camming ear is raised away from the travel path of the webbing segments with the rear surface being disposed in opposing, non-contacting relation above the webbing segments and upon rotating the distal lip towards the base frame, the rear surface remains in opposing, non-contacting relation above the webbing segments with the lower edge of the camming ear being lowered into compressing, clamping relation against the webbing segments.

12. The adjustable webbing clamp as recited in claim 11, wherein the webbing segments cooperatively form a helmet chinstrap.

13. The adjustable webbing clamp as recited in claim 11, wherein each of the base frame and the camming door is a polymeric molded structure of unitary construction.

14. The adjustable webbing clamp as recited in claim 11, wherein the door acceptance opening extends from a first end wall oriented transverse to the lateral sidewalls towards a second end wall oriented transverse to the lateral sidewalls, and wherein the first and second end walls are shorter than the lateral sidewalls.

15. The adjustable webbing clamp as recited in claim 14, the width of the door acceptance opening is greater at the first end wall than at the through holes.

16. The adjustable webbing clamp as recited in claim 11, wherein the rear surface extends in curved relation away from the lever portion to lower edge and wherein the lower edge is substantially parallel to the lever portion.

17. The adjustable webbing clamp as recited in claim 16, wherein upon rotating the distal lip towards the base frame, the lower edge is disposed at an elevation below upper edges of the webbing slots.

* * * * *